United States Patent Office 3,109,828
Patented Nov. 5, 1963

3,109,828
DIMETHYL SULFOXIDE-AROMATIC HYDROCARBON SOLVENT SYSTEM FOR VINYL CHLORIDE COPOLYMERS
Gerald P. Roeser, Lahaska, Pa., assignor, by mesne assignments, to Mobil Finishes Company, Inc., New York, N.Y., a corporation of Delaware
No Drawing. Filed Dec. 30, 1959, Ser. No. 862,757
5 Claims. (Cl. 260—30.8)

This invention relates to the use of dimethyl sulfoxide in conjunction with aromatic hydrocarbon solvents to form new solvent mixtures particularly adapted to dissolve copolymers of a major weight proportion of vinyl chloride with a vinyl fatty acid ester in which the acid forming the ester contains from 1 to 4 carbon atoms such as vinyl acetate.

Vinyl polymers and copolymers have become well known in many industries for their valuable properties, and one phase of their development has been a search for suitable solvents to form solutions of the polymers for various purposes, such as protective coatings, films, and various other plastic applications. There are a number of active solvents which have been found to be generally suitable for such purposes, such as isophorone, cyclohexanone and methyl ethyl ketone. Such active solvents are expensive, however, and consequently attempts have been made to find less expensive substitutes. The common aromatic hydrocarbon solvents are much less expensive, but they can be used only as diluents with more active solvents to dissolve the copolymers under consideration. In the case of copolymers of about 80% by weight or more of vinyl chloride with vinyl acetate, which are among the most widely accepted and useful of the vinyl compounds, particularly in the protective coating field, it is necessary to use expensive active solvents, either exclusively or in relatively large proportions with aromatic hydrocarbon diluents, in order to dissolve the vinyl chloride/vinyl acetate copolymers sufficiently to obtain a solution of suitable viscosity containing a desirable proportion of dissolved copolymer. The resultant expense and other difficulties have led to a long continued search for other solvent materials which could be used in smaller proportions with aromatic hydrocarbon solvents for obtaining suitable solutions of vinyl chloride/vinyl acetate copolymers.

I have discovered that there is a synergistic relation between dimethyl sulfoxide and liquid aromatic hydrocarbon diluents such as benzene, toluene and xylene, whereby the combination of the two is highly effective, particularly when used with copolymers of a major weight proportion of vinyl chloride with vinyl acetate containing less than substantially 93 mol percent of vinyl chloride. The special relation between the dimethyl sulfoxide component of the solvent system and the aromatic hydrocarbon component is illustrated by the fact that neither one of said components used alone is capable of dissolving the aforesaid vinyl chloride/vinyl acetate copolymers, but the combination of the two components does dissolve them. The combination is particularly valuable because of its usefulness as a solvent for vinyl chloride/vinyl acetate copolymers, which are of major commercial importance, and because a very high percentage of the aromatic hydrocarbon component, which is relatively inexpensive, can be used in the solvent mixture for purposes of dissolving vinyl chloride/vinyl acetatecopolymers, in spite of the fact that such copolymers are noted for their resistance to dissolution in conventional solvent mixtures containing like percentages of such aromatic hydrocarbon component.

Particularly suitable liquid mono-nuclear aromatic hydrocarbon solvents are benzene, toluene and xylene. Any of the isomeric xylenes can be used although commercial mixtures of the various xylenes are preferred, these being less expensive. In the mono-nuclear alkyl-substituted aromatic hydrocarbon solvent or mixtures thereof which can be used, lower alkyl substituents are preferred. Thus mono, di- and tri- substituted benzenes may be employed and suitable solvents include ethyl benzene and mesitylene. Propyl and butyl substituted benzenes may also be used. Commercial mixtures largely constituted by mixtures of the foregoing may also be used.

When used as a solvent for copolymers of about 87% by weight of vinyl chloride and about 13% by weight of vinyl acetate, the solvent composition of the invention is effective in a range of proportions of about 8% to about 95% by weight of dimethyl sulfoxide, based on the combined weight of the dimethyl sulfoxide and the aromatic solvent. For relatively low viscosity at relatively high solids content of said resin in the said solvent composition, the said range is preferably about 9% to about 75% by weight of dimethyl sulfoxide, most desirably between 9% and about 40% of dimethyl sulfoxide.

As the proportion of vinyl chloride in the copolymer is decreased below 87%, the greater solvency of the vinyl acetate in the copolymer makes the composition of the invention effective as a solvent for the copolymer with a progressively smaller minimum and larger maximum proportion of dimethyl sulfoxide.

In the results which are reported hereinafter, the viscosities of various solutions are compared. As will be appreciated, for a given proportion of dissolved solids, the existence of a lower viscosity (expressed as a smaller number of seconds) is indicative of the provision of a more workable solution and is also indicative of the ability of the solvent to dissolve a greater proportion of the resin. For practical solutions, the solvent mixture should contain at least 15%, preferably at least 18% by weight of dissolved copolymer, and contains less than 20% by weight of dimethyl sulfoxide.

The solvent mixtures of the invention are uniquely superior with respect to the components of the mixture for the dissolving of vinyl chloride/vinyl acetate copolymers irrespective of the molecular weight of the copolymer. Molecular weight is, nevertheless, of importance because it effects the amount of copolymer that can be dissolved to produce a solution of given viscosity. In brief, larger proportions of a copolymer of given composition can be dissolved when the copolymer is of lower molecular weight. The invention is particularly concerned with the dissolving of copolymers of vinyl chloride and vinyl acetate having a molecular weight corresponding to an intrinsic viscosity of from 0.2–1.0 measured in a 1% solution in cyclohexanone at 80° F.

The following Table I shows the effectiveness of dimethyl sulfoxide as compared with cyclohexanone and isophorone when used in various proportions with xylene, in terms of viscosities (in seconds at 80° F. with a #4 Ford cup) of compositions consisting of uniform samples of vinyl chloride/vinyl acetate copolymer (87/13 ratio, "VYHH") at 18% solids by weight in the various solvent mixtures (component ratios by weight):

TABLE I

*Comparative Viscosities When Using the New and Conventional Active Solvents With Xylene*

| Ratios of solvent components in col. headings (1)-(3)—active solvent/aromatic hydrocarbon | Viscosities (seconds at 80° F. with #4 Ford cup) of 18% solids "VYHH" in the following solvent combinations— | | |
|---|---|---|---|
| | (1) (cyclohexanone and xylene) | (2) (isophorone and xylene) | (3) (dimethyl sulfoxide and xylene) |
| 100/0 | 75 | 127 | Gel. |
| 95/5 | 69 | 103 | 126. |
| 75/25 | 52 | 89 | 66. |
| 50/50 | 42 | 62 | 41. |
| 33/67 | 42 | 60 | 36. |
| 25/75 | 47 | 68 | 36. |
| 15/85 | 68 | Gel | 38. |
| 10/90 | Swollen | Swollen | 52. |
| 9/91 | ---do--- | ---do--- | 60. |
| 7.5/92.5 | ---do--- | ---do--- | Gel. |
| 5/95 | ---do--- | ---do--- | Swollen. |
| 0/100 | Insoluble | Insoluble | Insoluble. |

Carrying forward the comparison of Table I, Table II shows the viscosity of 18% solutions of "VYHH" at 80° F. in solvent mediums containing 90 parts by weight of xylene and 10 parts by weight of various active solvents.

TABLE II

*Use of Solvent Mixtures Containing 90 Parts by Weight of Xylene and 10 Parts of a Solvent Component*

| Solvent component in admixture with xylene | Viscosity in No. 4 Ford Cup at 80° F. (seconds) |
|---|---|
| Methyl ethyl ketone | Swollen Gel. |
| Methyl isobutyl ketone | Insoluble. |
| Acetone | 123 (Gelled on Standing). |
| Dimethyl sulfoxide | 52. |

The following Table III shows the effect of using various aromatic hydrocarbon components in various proportions with dimethyl sulfoxide in terms of viscosity (in seconds at 80° F. with #4 Ford cup) of compositions consisting of uniform samples of vinyl chloride/vinyl acetate copolymer (87/13 ratio, "VYHH") at 18% solids by weight in the various solvent mixtures:

TABLE III

*Comparative Viscosities When Using Dimethyl Sulfoxide With Different Aromatic Hydrocarbons*

| Ratio of dimethyl sulfoxide to the aromatic hydrocarbon specified in adjacent headings (by weight) | Viscosities (seconds at 80° F. with #4 Ford cup) of 18% solids "VYHH" in solvent combination of dimethyl sulfoxide with— | | |
|---|---|---|---|
| | Benzene | Toluene | Xylene |
| 100/0 | Gel | Gel | Gel |
| 75/25 | 71 | 63 | 66 |
| 50/50 | 47 | 43 | 41 |
| 25/75 | 38 | 34 | 36 |
| 0/100 | Insol. | Insol. | Insol. |

The following Table IV shows the effectiveness of dimethyl sulfoxide and xylene with various kinds of vinyl resins, in terms of comparative viscosities (in seconds at 80° F. with #4 Ford cup) when using said dimethyl sulfoxide and xylene separately and in various combined proportions, with the resins:

TABLE IV

*Comparative Viscosities With Different Resins*

[Seconds at 80° F. with #4 Ford cup]

| Resin | Percent total solids | Ratio dimethyl sulfoxide/xylene (by weight) | | | | |
|---|---|---|---|---|---|---|
| | | 100/0 | 95/5 | 50/50 | 10/90 | 0/100 |
| "VYHH" | 18 | Gel | 126 | 41 | 52 | Insol. |
| "VYLF" | 20 | 27 | 24 | 17 | 16 | Insol. |
| "VMCH" | 18 | 125 | 96 | 37 | 42 | Insol. |
| "VAGH" | 18 | 220 | 153 | 47 | Swollen | Insol. |
| "VYNS" | 15 | Gel | Gel | 76 | Gel | Insol. |

In the above Table IV, "VYHH" and "VYLF" are copolymers of vinyl chloride and vinyl acetate in proportions of 87/13 by weight, the difference between the two lying in the fact that "VYHH" has a higher molecular weight. "VMCH" is a copolymer of vinyl chloride, vinyl acetate and maleic acid, in proportions by weight of 86/13/1. "VAGH" is a partially hydrolyzed copolymer of vinyl acetate and vinyl chloride, the copolymer being originally like "VYHH," but changed by hydrolysis to proportions by weight of 6% vinyl alcohol, 3% vinyl acetate and 91% vinyl chloride. "VYNS" is a copolymer of vinyl chloride and vinyl acetate in proportions by weight of 90/10.

The new solvent systems of the invention can be used alone or in conjunction with other solvents. Thus, up to about 5% of the aromatic hydrocarbon component may be replaced by aliphatic solvents, such as mineral spirits, although it is not preferred to do this unless the aliphatic solvents are contained in the commercial aromatic mixtures which are used. The point to be noted is that the solvent systems of the invention can tolerate the presence of minor quantities of aliphatic solvents.

The new solvent systems of the invention can also be combined with appropriate minor quantities, as for example, up to about 30% of active solvents for vinyl resins for the purpose of enhancing the solvent mixtures of this invention. Thus, methyl ethyl ketone, cellosolve acetate, dimethyl formamide, cyclic ketones such as cyclohexanone, isophorone, etc., may be added to the mixtures of dimethyl sulfoxide with mononuclear aromatic hydrocarbon solvents of the invention.

Compositions employing the polymer and solvent combinations of the invention are useful for protective coating and other purposes for which vinyl chloride/vinyl acetate solutions are used. For example, a composition of the above-described "VYHH" vinyl chloride/vinyl acetate copolymer at 16.5% applied solids in solvent consisting of 67% xylene and 33% dimethyl sulfoxide was filmed on tinplate at about 4.6 mg./sq. in. and baked thereon at 325° F. for ten minutes. The coating was tested for color, clarity, flow, adhesion, insolubility, flexibility, and, after pasteurization at 170° F. for 45 minutes, for blistering, spotting and wet adhesion. For purposes of comparison, a composition of the same copolymer at 18% applied solids in solvent consisting of 67% xylene and 33% isophorone was filmed on like specimens at about 5.4 mg./sq. in. and then baked and tested as stated above. The results were essentially the same in both cases, showing that coating qualities are not adversely affected by substitution of dimethyl sulfoxide for such standard solvents as isophorone in coating compositions of vinyl chloride/vinyl acetate copolymers. The composition of the invention can have a viscosity range of 20 to 150 seconds in #4 Ford cup at 80° F., and a solids concentration of vinyl chloride/vinyl acetate copolymer of up to about 24% by weight, for most protective coating purposes, but these ranges can be exceeded for some protective coating purposes.

Pigments, dyes, waxes and other non-reactants may be added to the composition of the invention for decorative purposes and the like, without otherwise materially affecting the significant characteristics of the composition.

While I have described present preferred embodiments of the invention and methods of practicing the same, it will be recognized that the invention is not limited thereto but may be otherwise variously embodied and practiced within the scope of the following claims.

I claim:

1. A resin composition comprising a copolymer of from 80 weight percent up to 93 mol percent of vinyl chloride with vinyl fatty acid ester in which the acid forming the ester contains from 1–4 carbon atoms, said copolymer having an intrinsic viscosity measured in a 1% solution in cyclohexanone at 80° F. of 0.2–1.0, said copolymer being dissolved in a solvent composition consisting essentially of a liquid mixture of dimethyl sulfoxide and liquid mononuclear aromatic hydrocarbon selected from the group consisting of benzene and lower alkyl-substituted products thereof, said dimethyl sulfoxide being present in said mixture in an amount of from 8–40% by weight.

2. A resin composition as recited in claim 1 in which said vinyl fatty ester is vinyl acetate.

3. A resin composition as recited in claim 1 in which said resin composition contains at least 15% by weight of said copolymer.

4. A resin composition as recited in claim 1 in which said resin composition contains at least 18% by weight of said copolymer.

5. A resin composition as recited in claim 4 in which said solvent composition contains less than 20% by weight of dimethyl sulfoxide.

References Cited in the file of this patent

UNITED STATES PATENTS

| | | |
|---|---|---|
| 2,136,378 | Doolittle | Nov. 15, 1938 |
| 2,174,912 | Thielking | Oct. 3, 1939 |
| 2,617,777 | Heisenberg et al. | Nov. 11, 1952 |
| 2,850,470 | Roeser | Sept. 2, 1958 |
| 2,865,879 | Roeser | Dec. 23, 1958 |
| 2,913,430 | Roeser | Nov. 17, 1959 |
| 2,918,443 | Roeser | Dec. 22, 1959 |
| 2,941,974 | Reymann et al. | June 21, 1960 |
| 3,006,715 | Lyman | Oct. 31, 1961 |